United States Patent [19]

Nedzu et al.

[11] Patent Number: 5,120,586

[45] Date of Patent: Jun. 9, 1992

[54] BAG HAVING EXCELLENT BLOCKING RESISTANCE

[75] Inventors: Shigeru Nedzu; Haruyasu Ito, both of Shizuoka, Japan

[73] Assignee: Polyplastics Co., Ltd., Osaka, Japan

[21] Appl. No.: 426,651

[22] Filed: Oct. 26, 1989

[30] Foreign Application Priority Data

Nov. 25, 1988 [JP] Japan .................. 63-297923

[51] Int. Cl.$^5$ .................. B29D 22/00; C08L 77/00
[52] U.S. Cl. .................. 428/35.2; 428/35.5; 428/483; 525/177; 383/109; 383/113
[58] Field of Search .................. 428/35.2, 35.5, 483; 525/177; 383/109, 113

[56] References Cited

U.S. PATENT DOCUMENTS 4,118,438  10/1978  Matsui et al. .................. 260/857 L
4,265,949   5/1981  Kugimiya .................. 428/35

Primary Examiner—James J. Seidleck
Assistant Examiner—Charles R. Nold
Attorney, Agent, or Firm—Nixon & Vanderhye

[57] ABSTRACT

Bags having increased blocking resistance properties are formed of a film composed of a resin blend of a polyethylene (PE) resin and a polybutylene terephthalate (PBT) resin having an intrinsic viscosity or 0.7 of more. Preferably, the film is a multi-layer structure formed via coextrusion inflation molding techniques having inner and outer layers laminated to one another. The inner layer is a polyolefin, while the outer layer is composed of a PE/PBT blend, in which the PBT is present in an amount of between 5 to 30 wt. % based on the total weight of the resin composition and has a melt index of 0.7 or more. The thickness ratio of the internal layer to the external layer is preferably between 95/5 to 30/70.

6 Claims, No Drawings

BAG HAVING EXCELLENT BLOCKING RESISTANCE

FIELD OF THE INVENTION

The present invention relates to a synthetic resin bag having excellent blocking resistance.

BACKGROUND AND SUMMARY OF THE INVENTION

Conventional bags which are adapted to be filled with fertilizers, feed, chemicals, and the like (i.e., the so-called "heavy-load bags") are typically made from polyethylene resin due to its physical strength and low cost (particularly when such bags are formed from a tubular polyethylene film by inflation molding techniques).

However, when heavy-load bags made of a polyethylene resin are filled with high temperature materials (e.g. between about 80 to 100° C.) and placed one on top of the other, thermal adhesion between bags in contact with one another usually occurs. This thermal adhesion (known as "blocking" in art parlance) not only makes the bags more difficult to handle, but also increases the possibility of bag breakage. For this reason, high temperature materials are usually either cooled below about 60° C before the heavy-load bags are filled, or the filled bags are cooled before being placed upon a pallet.

Examples of thermoplastic resins which are known to exhibit excellent heat resistance properties include polyethylene terephthalate resins, polyamide resins, polyphenylene sulfide resins, and polycarbonate resins. However, these resins are impractical to use for heavy-load bags due to the resins' high costs, difficult film-forming properties (particularly by inflation molding), and poor productivity during bag formation. Although blending such a heat-resistant resin with polyethylene resin has also been considered as an expedient, such a proposal has not been put to practical use due to the wide variance in mechanical and thermal properties that occur depending upon the dispersion and kneading conditions employed to form these resin blends.

Therefore, it is an object of the present invention to provide a bag having excellent blocking resistance which would thus be especially well suited for holding high-temperature materials. According to the invention, it has been found that blocking resistance for a bag can be increased by 10° to 30° C. when the bag includes an extruded external film layer comprised of between about 5 to 30% by weight (based on the total weight of a composition) of a particular polyethylene resin (to be described below).

The term "blocking resistance" used herein and in the accompanying claims is intended to mean a value obtained by measurement according to JIS Z 1514, items 6, 7 (incorporated by reference herein).

Accordingly, the present invention provides a bag having excellent blocking resistance characterized by including an external film layer comprised of a resin composition composed of a polyethylene (PE) resin and between about 5 to 30% by weight (based on the resin composition) of a polybutylene terephthalate (PBT) resin having an intrinsic viscosity of 0.7 or more.

DETAILED DESCRIPTION OF THE PREFERRED EMBODIMENTS

Any suitable polyethylene resin may be used according to the present invention so as to form a mixture with polybutylene terephthalate resin. In this regard, any polyethylene resin usually employed in forming bags may be used. Examples of the suitable polyethylene resins include low-density polyethylene resins (LDPE), linear low-density polyethylene resins (L-LDPE), and copolymers thereof, which may be used either alone or in combination. L-LDPE is particularly preferable. The melt index of the polyethylene resin is preferably between 0.1 to 5.0.

The polybutylene terephthalate resin that may be used to form the bags of the present invention is preferably one formed by polycondensation of 1,4-butanediol with terephthalic acid, or an ester thereof, with a lower alcohol and may be a copolymer mainly composed of polybutylene terephthalate. In the present invention, it is necessary to use polybutylene terephthalate having an intrinsic viscosity of 0.7 or greater from the viewpoint of preparing a film by inflation molding techniques. Use of a polybutylene terephthalate resin having an intrinsic viscosity of 1.0 or greater is particularly preferred.

The present invention is characterized by using as an external layer of a bag, a film prepared from a resin composition composed of the above-described polyethylene resin and between 5 to 30% by weight (based on the total weight of the composition) of a polybutylene terephthalate resin blended with the polyethylene resin. When the polybutylene terephthalate resin content of the film is less than 5% by weight, the blocking resistance is not noticeably improved. On the other hand, when the content exceeds 30% by weight, the dispersion of the polybutylene terephthalate resin in the polyethylene resin is poor. Poor PBT dispersion unfavorably lowers the composition's physical and film-forming properties, and also lowers the adhesion between the internal and external film layers which may form the bag.

The polyethylene resin may be previously blended with the polybutylene terephthalate resin in an extruder separate from the film-forming line, or alternatively, may be blended in an extruder just prior to film formation. However, since physical properties are reduced when polybutylene terephthalate resin dispersion is poor, it is preferable to blend the PE and PBT previously in a separate extruder.

Although it is possible to form a bag having desired blocking resistance using a single layer film formed of the above-described PE/PBT resin blend, the bag may notexhibit all of the physical properties (e.g. tear strength) desired and/or required for some end-use applications.

Accordingly, it is particularly preferred to form the bags of the present invention from a film laminate. The film laminate employed to form the bags of this invention will include an outer film layer comprised of the PE/PBT blend discussed above, laminated to an inner polyolefin film layer. A bag formed of such a laminated film will exhibit a desirable combination of mechanical strength and blocking resistance.

The laminated film embodiment of the present invention thus provides a bag having excellent blocking resistance, and is formed using a film prepared by molding and laminating a polyolefin resin by inflation co-extrusion on the interior of a film formed of a resin composition which includes a polyethylene resin and between 5 to 30% by weight (based on the resin composition) of a polybutylene terephthalate resin having an intrinsic viscosity of 0.7 or more.

The polyethylene resin which may be used in admixture with polybutylene terephthalate resin is substantially the same as that used in the first embodiment of the invention described above (i.e., the non-laminated film embodiment). However, in the laminated film embodiment of the invention it is preferred that the melt index of the polyethylene resin be from 0.1 to 15. When the melt index is less than 0.1, the extruder motor load during film formation due to high resin viscosity is high, thereby lowering productivity. On the other hand, when the melt index exceeds 15, the viscosity is too low such that productivity is similarly lowered in addition to making it difficult (and usually impossible) to form a homogeneous coextruded film. The melt index of the polyethylene is most preferably between 0.1 to 5.0.

Examples of suitable polyolefin resins that may be used for the internal film layer according to the present invention include homopolymers of olefins, such as ethylene, propylene, butene, isoprene, pentene and methylpentene, and their copolymers, having a melt index of between 0.1 to 5.0. Polyethylene and its copolymers are particularly preferred. When the melt index is less than 0.1, the motor load on the extruder during film formation increases due to high viscosity, which lowers productivity. On the other hand, when the melt index exceeds 5.0, the viscosity is too low, which not only makes film formation difficult, but also unfavorably lowers the mechanical properties (particularly tensile elongation) of the film.

It is impossible to successfully laminate the polyolefin resin film (internal layer) onto a polybutylene terephthalate-containing polyethylene resin film (external layer) through thermal adhesion. Moreover, use of an adhesive for lamination also often results in delamination during use. For this reason, it is preferred to form the bags of this invention from a film having a two-layer film structure prepared by inflation co-extrusion using polyolefin resin as an internal layer, and polyethylene resin composition containing between 5 to 30% by weight (based on the total weight of the composition) of polybutylene terephthalate resin as an external layer. It is therefore possible to form a bag exhibiting an increased blocking resistance of between about 5 to 30° C., sufficient interlaminar adhesion strength without the use of an adhesive, and strengths necessary for a heavy-load bag (particularly tensile elongation and tear strength in a direction perpendicular to the extrusion direction of the film) comparable to those of a bag formed entirely of polyethylene resin.

In the case of a multi-layer film laminate structure, the external layer is preferably as thin as possible since it is used for the purpose of improving the bag's blocking resistance. The internal layer, however, has a thickness sufficient to provide the necessary mechanical strength for the bag. The total thickness of the film laminate is preferably between 50 to 500μm, and more preferably between 60 to 300μm. Moreover, the thickness ratio of the internal layer to the external layer is preferably between 95/5 to 30/70.

In the case of a resin composition comprising a polyethylene resin having a melt index of 0.1 to 15 which includes between 5 to 30% by weight (based on the total weight of the composition) of a polybutylene terephthalate resin having an intrinsic viscosity of 0.7 or more, it is preferred that the viscosity ratio of the polybutylene terephthalate resin to the polyethylene resin be within the range represented by the following formula:

viscosity ratio $\mu_A/\mu_B = 0.15$ to $2.5$ wherein $\mu_A$: viscosity of polybutylene terephthalate resin as determined at a shear rate of 100 sec$^{-1}$ at 240° C., $\mu_B$: viscosity of polyethylene resin as determined at a shear rate of 100 sec$^{-1}$ at 240° C.

When the viscosity ratio, $\mu_A/\mu_B$, is less than 0.15 or exceeds 2.5, the resin dispersion is poor.

Known additives for thermoplastic and thermosetting resins, i.e., plasticizers, stabilizers such as antioxidants and ultraviolet absorbers, antistatic agents, surfactants, colorants such as dyes and pigments, lubricating agents for the purpose of improving flowability, crystallization accelerators (nucleating agents), etc. may be added to the resin compositions described above to achieve desired performance characteristics. It is also possible to add as auxiliaries small amounts of other thermoplastic resins and inorganic fillers as may be needed to achieve certain purposes as long as they do not deleteriously affect the present invention.

The bags of the invention are most preferably formed of a composition comprising between 5 to 30 wt. % of polybutylene terephthalate having an intrinsic viscosity of 0.7 or larger and 70 to 95 wt. % of polyethylene (based on the weight of the composition).

The bags of the present invention thus exhibit improved blocking resistance without sacrificing the mechanical strength necessary for such bags, e.g., tensile strength, tensile elongation and tear strength. The increased blocking resistance also allows the cooling time for high-temperature materials intended to be placed in the bags to be reduced (or eliminated).

EXAMPLES

The present invention will now be described in more detail with reference to the following Examples, which should not be construed as limiting the scope of the present invention.

EXAMPLES 1 TO 8 AND COMPARATIVE EXAMPLES 1 TO 6

Films shown in Table 1 were prepared by the following method and subjected to physical property evaluation as described below.

A linear low-density polyethylene resin having a melt index of 0.5 (Ultzex 2005; a product of Mitsui Petrochemical Industries, Ltd.) used in prior art heavy-load bags was kneaded with a polybutylene terephthalate resin having an intrinsic viscosity of 1.4 (as determined in o-chlorophenol solution at 25° C.) with a twin-screw extruder of 40 mmφ at a cylinder temperature of 240° C. in amounts of blending shown in Table 1. The mixture was thereafter pelletized. The viscosity ($\mu_A$) of the polybutylene terephthalate resin as determined at a shear rate of 100 sec $^{-1}$ at 240° C. and the viscosity ($\mu_B$) of the polyethylene resin as determined at a shear rate of 100 sec$^{-1}$ at 240° C. were 15000P and 12000P, respectively, so that the viscosity ratio $\mu_A/\mu_B$ was 1.25.

The kneaded resin was extruded with an inflation molding machine through a die having a diameter of 100 mmφ at a cylinder temperature of 220° C. and a die temperature of 240° C. to prepare an inflation film having a blow-up ratio of 2.9. Then, extrusion was conducted with a two-layer inflation film molding machine through a die having a diameter of 100 mmφ by making use of the kneaded resin as an external layer and a linear low-density polyethylene resin having a melt index of 0.5 as an internal layer at an internal layer extruder cylinder temperature of 220° C. and a die temperature of 240° C. to prepare an inflation film having a blow-up ratio of 2.9 and a thickness of 150 μm (internal layer/external layer=50/50).

The data on Comparative Example 1 are physical properties of a simple inflation film comprising only a linear low-density polyethylene resin having a melt index of 0.5.

The physical properties of the bag were evaluated by the following measuring method.

Blockinq resistance

Blocking resistance properties were measured according to JIS Z 1514.

x: bonding strength was very low, and peeling readily occurred.

Melt Index

Melt Index was measured at 190° C. under a load of 2160 g according to ASTM D 1238.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

TABLE 1

|  |  | Comp. Ex. 1 | Comp. Ex. 2 | Ex. 1 | Ex. 2 | Ex. 3 | Ex. 4 | Comp. Ex. 3 | Comp. Ex. 4 |
|---|---|---|---|---|---|---|---|---|---|
| PBT resin in external layer (wt %) |  | 0 (single-layer) | 3 (single-layer) | 5 (single-layer) | 10 (single-layer) | 15 (single-layer) | 30 (single-layer) | 50 (single-layer) | 100 |
| film thickness (μm) | external layer | 150 | 150 | 150 | 150 | 150 | 150 | 150 | 150 |
|  | internal layer | — | — | — | — | — | — | — | — |
| tensile strength (yield point) (kgf/cm²) | TD | 108 | 107 | 110 | 110 | 88 | 61 | 33 | 450 |
| tensile strength (%) | TD | 500 or more | 300 | 200 | 150 | 80 | 15 | 3 | 400 |
| tear strength (kgf/cm) JIS Z 1702 | MD | 71 | 49 | 48 | 6 | 6 | 5 | 3 | 10 |
|  | TD | 207 | 206 | 211 | 219 | 161 | 113 | 72 | 12 |
| interlaminar bonding strength |  | — | — | — | — | — | — | — | — |
| heat-sealability |  | ⊚ | ⊚ | ⊚ | ◯ | ◯ | Δ | X | X |
| blocking resistance (°C.) |  | 55 | 60 | 65 | 80 | 85 | 90 | 105 | 210 |

|  |  | Comp. Ex. 5 | Ex. 5 | Ex. 6 | Ex. 7 | Ex. 8 | Comp. Ex. 6 |
|---|---|---|---|---|---|---|---|
| PBT resin in external layer (wt %) |  | 3 | 5 | 10 | 15 | 30 | 50 |
| film thickness (μm) | external layer | 75 | 75 | 75 | 75 | 75 | 75 |
|  | internal layer | 75 | 75 | 75 | 75 | 75 | 75 |
| tensile strength (yield point) (kgf/cm²) | TD | 103 | 103 | 107 | 103 | 108 | 109 |
| tensile strength (%) | TD | 500 or more | 500 or more | 500 or more | 500 or more | 500 or more | 500 or more |
| tear strength (kgf/cm) JIS Z 1702 | MD | 81 | 77 | 70 | 70 | 64 | 41 |
|  | TD | 210 | 210 | 215 | 203 | 189 | 166 |
| interlaminar bonding strength |  | ⊚ | ⊚ | ⊚ | ⊚ | ⊚ | Δ |
| heat-sealability |  | ⊚ | ⊚ | ⊚ | ⊚ | ⊚ | ⊚ |
| blocking resistance (°C.) |  | 60 | 65 | 80 | 85 | 90 | 105 |

Note:
MD: direction of flow during film formation
TD: direction perpendicular to MD Heat-sealability A test piece of a width of 15mm was sealed under heat sealing conditions of a temperature of 80° C., a pressure of 1 kg/cm² and a time of 2 sec, and sealing strengths of 0 to 500 gf, 500 to 1000 gf, 1000 to 1500 gf and 1500 gf or more were evaluated as X, Δ, ◯, and ⊚, respectively.

Interlaminar bonding strength

The bonding strength between the external layer and the internal layer was measured according to JIS 6854 and evaluated as follows:

⊚: bonding strength was very high, and no peeling occurred.

◯: bonding strength was high, and peeling hardly occurred.

Δ: bonding strength was very low, and peeling readily occurred.

What is claimed is:

1. A bag having improved blocking resistance comprising a film which consists essentially of a resin composition including a polyethylene resin, and between 5 to 30% by weight, based on the total weight of the resin composition, of a polybutylene terephthalate resin having an intrinsic viscosity of 0.7 or more, and wherein said resin composition has a viscosity ratio $\mu_A/\mu_B$ of between 0.15 to 2.5, where $\mu_A$ and $\mu_B$ are the respective viscosities of the polybutylene terephthalate resin and the polyethylene resin as determined at a shear rate of 100 sec$^{-1}$ and a temperature of 240° C.

2. A bag according to claim 1, wherein said polyethylene resin has a melt index of 0.1 to 5.0.

3. A bag having excellent blocking resistance comprising a multi-layer film having an inner layer which consists essentially of a polyolefin resin having a melt index of 0.1 to 5.0, and an outer layer consisting essentially of a resin composition composed of a polyethylene resin and between 5 to 30% by weight, based on the total weight of the resin composition, of a polybutylene terephthalate resin having an intrinsic viscosity of 0.7 or more, and wherein said resin composition has a viscosity ratio $\mu_A/\mu_B$ of between 0.15 to 2.5, where $\mu_A$ and $\mu_B$ are the respective viscosities of the polybutylene terephthalate resin and the polyehtylene resin as determined at a shear rate of 100 sec$^{-1}$ and a temperature of 240° C.

4. A bag having excellent blocking resistance according to claim 3, wherein said polyethylene resin has a melt index of 0.1 to 15.

5. A bag having excellent blocking resistance according to claim 3 or 4, wherein said polyolefin resin is a polyethylene resin.

6. A bag having excellent blocking resistance comprised of a multi-layer film having an internal layer consisting essentially of a polyethylene resin having a melt index of between 0.1 to 5.0, and an external layer consisting essentially of a resin composition composed of (i) a polyethylene resin having a melt index of between 0.1 to 15, and (ii) between 5 to 30% by weight, based on the total weight of the resin composition of a polybutylene terephthalate resin having an intrinsic viscosity of 0.7 or more, wherein said inner and outer layers are laminated to one another by co-extrusion inflation such that the thickness ratio of said internal layer to said internal layer is between 95/5 to 30/70, and wherein said resin composition has a viscosity ratio $\mu_A/\mu_B$ of between 0.15 to 2.5, where $\mu_A$ and $\mu_B$ are the respective viscosities of the polybutylene terephthalate resin and the polyethylene resin as determined at a shear rate of 100 sec$^{-1}$ and a temperature of 240° C.

* * * * *

UNITED STATES PATENT AND TRADEMARK OFFICE
CERTIFICATE OF CORRECTION

PATENT NO. : 5,120,586

DATED : June 9, 1992

INVENTOR(S) : NEDZU et al

It is certified that error appears in the above-identified patent and that said Letters Patent is hereby corrected as shown below:

Column 2, line 49, change "notexhibit" to --not exhibit--.

Signed and Sealed this

Third Day of August, 1993

Attest:

MICHAEL K. KIRK

Attesting Officer     Acting Commissioner of Patents and Trademarks